(12) United States Patent
Takahashi et al.

(10) Patent No.: US 7,159,132 B2
(45) Date of Patent: Jan. 2, 2007

(54) USB DEVICE THAT PROVIDES POWER THAT IS DIFFERENT FROM POWER PRESCRIBED IN THE USB STANDARD

(75) Inventors: Hirota Takahashi, Iwatsuki (JP); Hiroshi Sugita, Iwatsuki (JP); Kenichi Sonobe, Iwatsuki (JP); Kazuya Edogawa, Iwatsuki (JP); Tomokazu Kaneko, Iwatsuki (JP); Tsutomu Hoshino, Iwatsuki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 443 days.

(21) Appl. No.: 10/320,534

(22) Filed: Dec. 17, 2002

(65) Prior Publication Data

US 2003/0172312 A1    Sep. 11, 2003

(30) Foreign Application Priority Data

Mar. 7, 2002 (JP) .............................. 2002-061717

(51) Int. Cl.
*G06F 1/26* (2006.01)
(52) U.S. Cl. ...................... 713/310; 713/300; 710/313; 710/300
(58) Field of Classification Search ...................... None
See application file for complete search history.

(56) References Cited

U.S. PATENT DOCUMENTS

| | | | | |
|---|---|---|---|---|
| 5,842,027 A | * | 11/1998 | Oprescu et al. | 713/300 |
| 5,884,086 A | * | 3/1999 | Amoni et al. | 713/300 |
| 6,744,634 B1 | * | 6/2004 | Yen | 361/752 |
| 6,774,604 B1 | * | 8/2004 | Matsuda et al. | 320/110 |

* cited by examiner

*Primary Examiner*—James K. Trujillo
*Assistant Examiner*—Anand B. Patel
(74) *Attorney, Agent, or Firm*—Oliff & Berridge, PLC

(57) ABSTRACT

A USB device for performing communications with a second device through a USB interface while supplying electric power to the second device through a power-source supplying line in the USB interface. The USB device includes a communication unit for communicating with the second device, a power source capable of outputting electric power of a voltage being different from a standard power voltage prescribed in the standards of the USB interface. The power source supplies the electric power to the second device through the power-source supplying line. The second device includes a low load unit and a high load unit The power source supplies the electric power having a power voltage higher than the standard power voltage to the high load unit through the power-source supplying line.

8 Claims, 3 Drawing Sheets

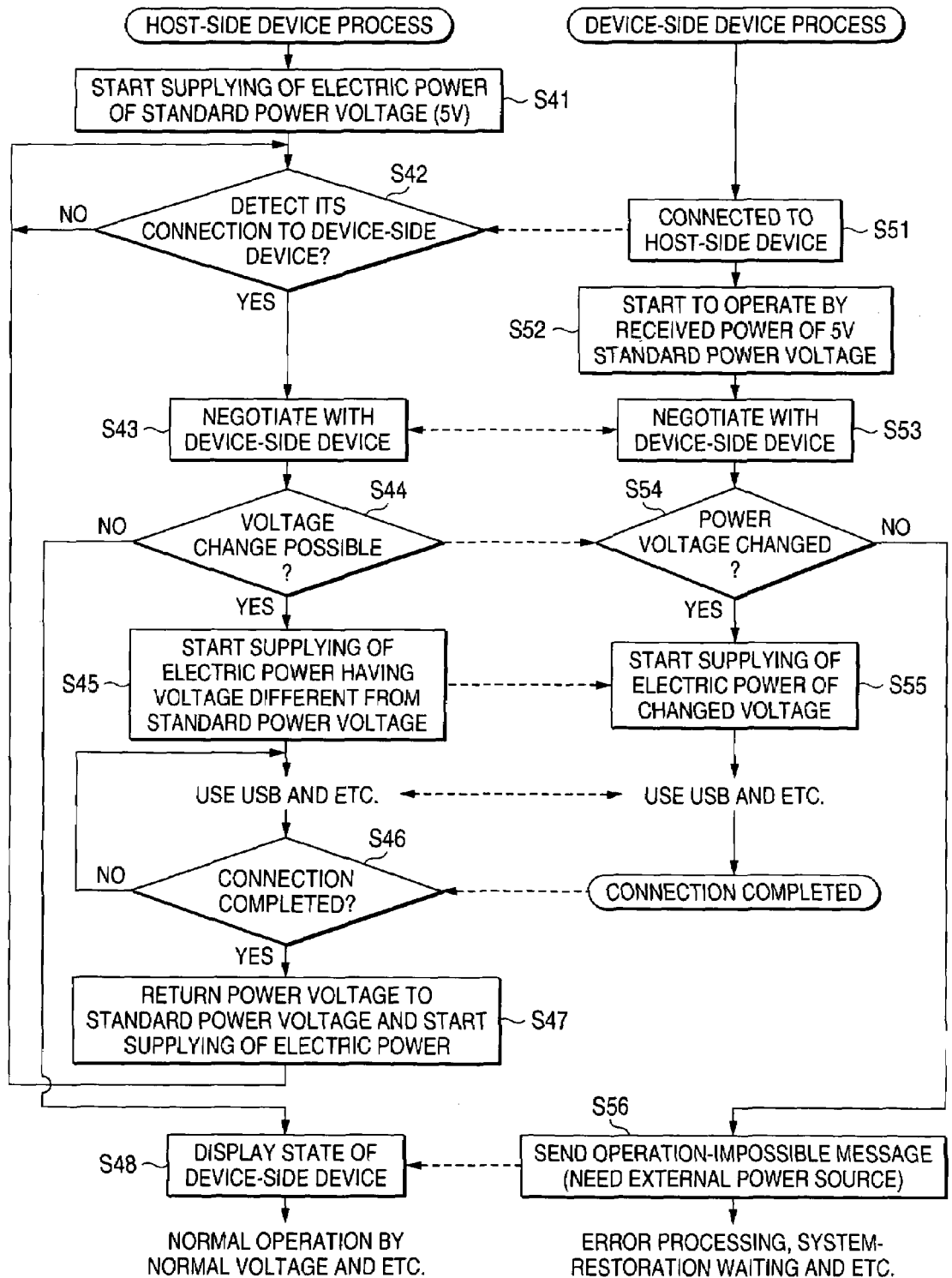

USB DEVICE THAT PROVIDES POWER THAT IS DIFFERENT FROM POWER PRESCRIBED IN THE USB STANDARD

BACKGROUND OF THE INVENTION

1. Field of the Invention

The present invention relates to USB devices which perform communications through a USB interface.

2. Background Art

Recently, the interface as specified by the USB standard has widely been used. FIGS. 3A and 3B are explanatory diagrams for roughly explaining an electrical connection when devices are connected by use of a USB interface. In the figure, reference numeral 31 is a host-side device; 32 is a host-side interface chip; 33 to 34 are resistors; 35 is a cable; 36 is a device-side device; and a 37 is a device-side interface chip. The USB is a serial interface of four core wires, and the host-side device 31 is connected to the device-side device 36 by a four core-wire cable 35. The four core wires are a power-source supplying line (Vbus), a ground line (CND), and two data lines (D+ and D−).

The data lines are connected to the host-side interface chip 32 in the host-side device-31 and the device-side interface chip 37 in the device-side device 36, and used for transferring data between both the chips. The two data lines are earthed through resistors 33 and 34, respectively. The resistors 33 and 34 maybe resistors of about 15 kΩ. In the device-side device 36, when it is a full speed device, the data line D+ is connected to the power source via the resistor 38 as shown in FIG. 3A. When it is a low speed device, the data line D− is connected to the power source via the resistor 38 as shown in FIG. 3B. The resistor 38 has a resistance of about 1.5 kΩ.

In the USB standard, electric power may be supplied from the host-side device 31 to the device-side device 36 by use of the power-source supplying line and the ground line. A maximum power specified in the USB standard is defined by 5V and 500 mA. Accordingly, for the connection of a device of relatively low power consumption, e.g., a computer mouse, as the device-side device, no external power source is required. Then, enhanced convenience is secured, and provision of low cost device is realized.

The devices that are connected by utilizing the USB interface are not only devices that consume low power. Those devices include devices consuming larger electric power and devices requiring voltage other than 5V. Also the device of the assembling type is constructed to utilize the USB interface for the connection of related parts thereof. Since those related parts are customized, the power source specifications are frequently different from the standard specifications of the USB interface. The power sources of 3.3V and 24V, for example, are frequently needed in addition to the power source of 5V.

In a case where the standard electric power prescribed by the USB interface standards is insufficient for the electric power consumed by the device-side device or the power voltage of the USB interface is not coincident with the required power voltage, another power source is separately provided. If another power source is installed to the device-side device in addition to the power source for the host-side device, the cost of the device-side device is much increased. It is a common practice that the power source is additionally provided, in the device as separately sold, such as printers or scanners, however. Installation of some power sources in one device, as in an assembling type device, leads to increase of the device, and is unacceptable since those will excessively occupy the limited inner space of the device.

For the difference of only the power voltages, a measure is easy; for example, a DC-DC converter is provided in the device-side device and converts the voltage of 5V to a voltage of a desired value. The measure is incapable of supplying sufficient electric power to such a device that needs electric power which exceeds the standard electric power of 5V and 500 mA.

Another possible solution to this power source problem is present. In the solution, power source wires are provided between the host-side device and the device-side device, and necessary electric power is supplied to the device-side device through the wires, in addition to the power source of the USB. This approach is equivalent to the case using the dedicated interface, and advantages brought about by using the standardized interface, or USB, is much reduced.

Thus, the USB interface alone is incapable of supplying electric power to the device-side device which consumes electric power in excess of the standard USB power supplying ability and the device-side device customized to have specific power source specifications.

SUMMARY OF THE INVENTION

Accordingly, an object of the present invention is to provide a USB device which is capable of supplying electric power in excess of 5V and 500 mA as prescribed by the USB interface standards to the device-side device by using only the general USB interface, with a minimal increase of cost.

The present invention may be summarized such that when electric power is supplied from a host-side USB device (a host device), which is connected to a device-side USB device (a second device) through a USB interface, to the device-side USB device, the electric power has a power voltage other than the standard power voltage. When electric power having a power voltage, which is higher than the standard power voltage, is supplied to the device-side USB device, much power is supplied to the device-side USB device at the same standard current value. Accordingly, even if the device-side USB device includes a high load means consuming large power, there is no necessity of using another power source, separately provided. In other words, the electric power can be supplied to the device-side USB device by only the USB interface. If the power source specifications of the device-side USB device require a power voltage different from the standard power voltage, the USB device can supply electric power having a power voltage specified by the power source specifications.

When the device-side USB device is previously selected, the supply of electric power of a power voltage different from the standard power voltage can be carried out from the start. When another type of device-side USB device is to be connected to the host-side USB device, the function of supplying electric power of the standard power voltage is provided. Those electric power supplying functions are selectively used according to a situation. To this end, a power source capable of supplying electric powers of plural power voltages is provided in the host-side USB device. Select means for selecting one of those power voltages is also provided. The electric power of the power voltage selected by the select means is supplied to the device-side USB device.

When the device-side USB device is connected to the host-side USB device in a plug-in manner or the power source is turned on after the connection is set up, in the host-side USB device, it remains to be seen whether or not the supplying of electric power of a power voltage different from the standard power voltage is needed. Therefore, the host-side USB device first supplies electric power of the standard power voltage. The device-side USB device requests the host-side USB device to supply electric power of another power voltage, e.g., large electric power, during the negotiation with the host-side USB device. The host-side USB device responsively supplies electric power having a power voltage other than the standard power voltage based on the result of the negotiation with the device-side USB device. Only when the host-side USB device is connected to the device-side USB device, which needs the supply of electric power having a power voltage other than the standard power voltage, it supplies electric power of such a voltage, while it supplies electric power of the standard power voltage to other device-side USB devices.

When completion of the connection to the device-side USB device which needs electric power of a power voltage different from the standard power voltage is detected (the device is disconnected or the power supply is interrupted), the power voltage is returned to the standard power voltage. With this, the host-side USB device can accept the connection of any type of device-side USB device to be subsequently connected thereto.

When the host-side USB device cannot comply with a request of supplying electric power of a power voltage different from the standard power voltage, which is issued from the device-side USB device which needs the supply of electric power of a power voltage being different from the standard power voltage, the negotiation fails. In this case, the device-side USB device cannot operate frequently. Therefore, the device-side USB device informs the host-side USB device that an external power source is needed. The host-side USB device responsively informs the user of that by use a display means. Then, the user can take measure for the inoperable condition.

In such a case, if the requests by the device-side USB devices are coincident with one another, the power voltage is selected according to an instruction based on the request and the electric power of the selected power voltage is supplied. If those requests are not coincident, the electric power of the standard power voltage is supplied to the device-side USB device for the purpose of protecting the device-side USB device.

BRIEF DESCRIPTION OF THE DRAWINGS

FIG. 2 is a flow chart an operation of the system when connection between a host-side device 1 and a device-side device 2 starts.

DETAILED DESCRIPTION OF THE PREFERRED EMBODIMENTS

Figure 1:
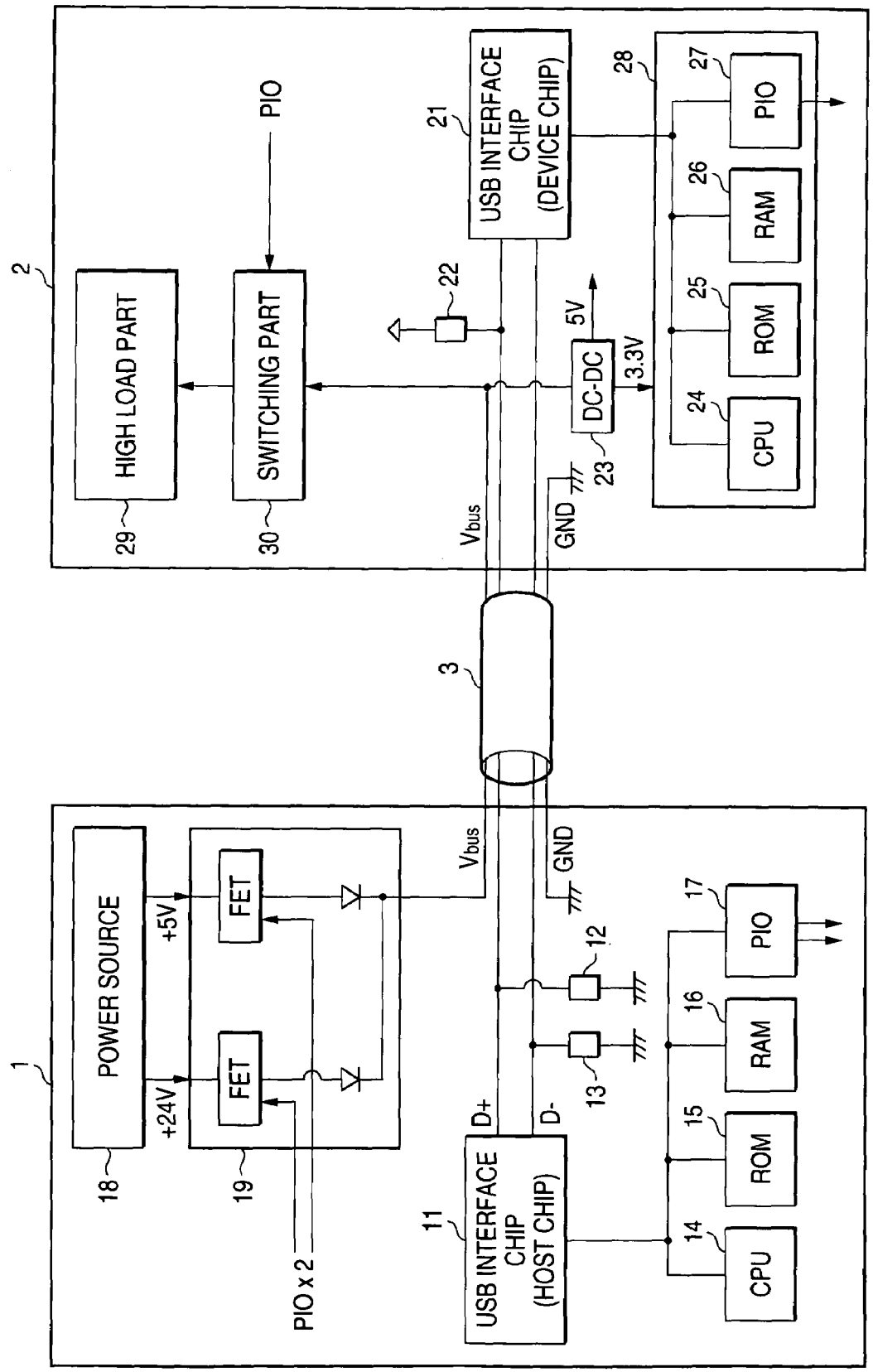
FIG. 1 is a block diagram showing an example of a system including a host-side USB device and a device-side USB device, which form an embodiment of the present invention.
Figure 3A:
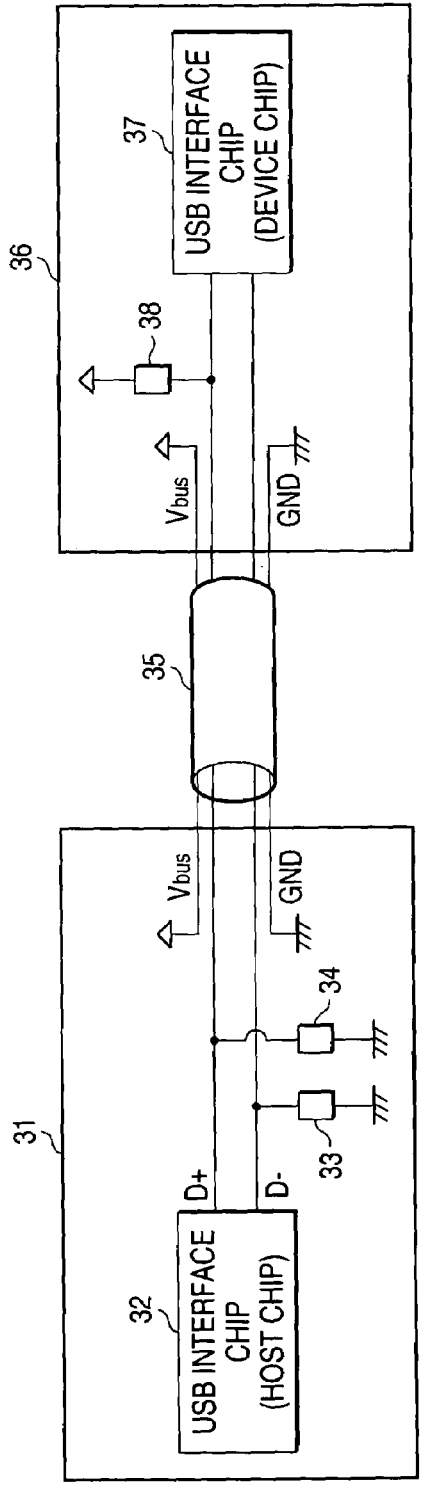
FIG. 3A is an explanatory diagram for roughly explaining an electrical connection when devices are connected by use of a USB interface.
Figure 3B:
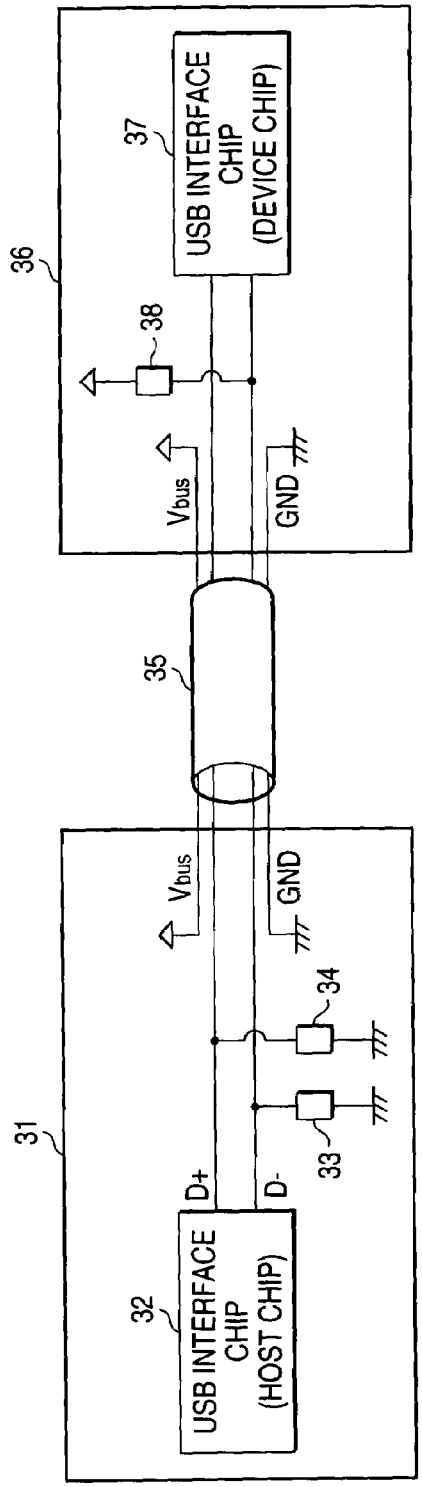
FIG. 3B is another explanatory diagram for roughly explaining an electrical connection when devices are connected by use of a USB interface.

FIG. 1 is a block diagram showing an example of a system including a host-side USB device and a device-side USB device, which form an embodiment of the present invention. In the figure, reference numeral 1 is a host-side device; 2 is a device-side device; 3 is a cable; 11 and 21 are USB interface chips; 12, 13 and 22 are resistors; 14 and 24 are CPUs; 15 and 25 are ROMs; 16 and 26 are RAMs; 17 and 27 are PIOs; 18 is a power source; 19 is a voltage selector; 23 is a DC-DC converter; 28 is a low load part; 29 is a high load part; and 30 is a switching part. The host-side device 1 and the device-side device 2 are interconnected by the cable 3 and through the USB interface.

The host-side device 1 includes the USB interface chip 11, resistors 12 and 13, CPU 14, ROM 15, RAM 16, PIO (peripheral I/O) 17, power source 18 and voltage selector 19. The USB interface chip 11 communicates with the device-side device 2 through data lines D+ and D−. The resistors 12 and 13 are inserted between the data lines D+ and D−, and ground according to the USB standards.

The CPU 14, ROM 15, RAM 16 and PIO 17 form an active arrangement for performing various operations in the host-side device 1. With those arrangements, the host-side device processes data that is received from the device-side device 2 via the USB interface chip 11, and transfers data to the device-side device 2, via the USB interface chip 11. Further, it controls the voltage selecting operation in the voltage selector 19, and supplies electric power other than the standard power voltage to the device-side device 2, if necessary.

The power source 18 is capable of supplying plural electric powers of different voltages. The voltage selector 19 selects one of plural voltages of electric powers that are supplied from the power source 18, and supplies the selected one to the device-side device 2 via the power supplying line of the USB interface. In the instance of FIG. 1, two voltages, 5V as the standard power voltage and 24V higher than the former, are supplied from the power source 18. One of the voltages is selected by the voltage selector 19. The voltage selector 19 may be constructed optionally. In this instance, the voltage selector 19 receives a signal output from the PIO 17 and a switching element (FET) contained therein is driven to select one of the voltages. Any other suitable voltage selecting method may be employed, as a matter of course.

The device-side device 2 is made up of the USB interface chip 21, resistor 22, DC-DC converter 23, CPU 24, ROM 25, RAM 26, PIO 27, high load part 29, and switching part 30. As in the host-side device 1, the USB interface chip 21 communicates with the host-side device 1 through the data lines D+ and D−. The resistor 22 is a pull-up resistor, which is inserted between the data line D− and the power source when the device-side device 2 is a full speed device, and is inserted between the data line D+ and the power source when the device-side device 2 is a low speed device. In the FIG. 1 instance, the device-side device 2 is a full speed device.

The CPU 24, ROM 25, RAM 26 and PIO 27 form an arrangement for performing various operations in the device-side device 2. With those arrangements, the device-side device processes data received from the host-side device 1 through the USB interface chip 21, and transfers the data to the host-side device 1 through the USB interface chip 21. Further, to receive the electric power to be consumed by the high load part 29 from the host-side device 1, the device-side device sends a request to change the supplied voltage on the voltage supplying line to the host-side device 1, and it carries out a switching control when the voltage is changed. When the voltage change as requested is not carried out, the device-side device displays a message of "Needs an external power source" by display means contained therein or sends the message to the host-side device 1.

The CPU 24, ROM 25, RAM 26 and PIO 27 form the low load part 28. The low load part 28 operates at, for example, 5V or lower (e.g., about 3.5V). In the description to be given hereunder, it is assumed that the low load part 28 operates at voltage lower than 5V. The USB interface chip 21 may be contained in the low load part 28; however, in this instance, it operates at 5V and hence, it is not contained in the low load part 28.

The DC-DC converter 23 converts the voltage of the electric power fed through the power supplying line of the USB interface chip to an operation voltage of the low load part 28, in order to supply the electric power to the low load part 28. For example, when a voltage of 5V (standard power voltage) of the electric power is present on the power supplying line, the DC-DC converter converts 5V to 3.3V, for example. When a voltage of, for example, 24V, which is other than the standard power voltage, appears on the power supplying line, it converts 24V to 3.3V, for example. At this time, the DC-DC converter converts the power voltage received to a voltage of 5V, which is for operating the USB interface chip 21, for example. Any of those voltages is selected in accordance with a signal derived from the PIO 27, for example.

The high load part 29 contains motors, lamps and the like, and provides various functions in the device-side device 2, and consumes relatively high electric power. In this instance, the high load part operates at 24V, and the standard electric power of 5V and 500 mA is insufficient for operating the high load part.

The switching part 30 allows the supply of electric power to the high load part 29 and stops the power supply to the high load part. For example, when the electric power is supplied at the standard power voltage of the USB interface, the switching part stops the power supply to the high load part 29 to prohibit the high load part 29 from operating. When the supplying of electric power at such a voltage as to allow the high load part 29 to operate, starts, electric power is supplied to the high load part 29 to allow the high load part to operate. The switching part 30 may be constructed with a switching element, e.g., FET. In this case, the switching element may be switched in response to a signal derived from the PIO 27.

Description will now be given about operations of the system including the host-side USB device and the device-side USB device, which form the embodiment of the invention. FIG. 2 is a flow chart an operation of the system when connection between the host-side device 1 and the device-side device 2 starts. Operations of the host-side device 1 and the device-side device 2 will be described concurrently. In an initial state, in this instance, the voltage selector 19 of the host-side device 1 has selected the voltage of 5V, prescribed in the USB interface standards, and electric power of 5V is supplied (step S41).

The device-side device 2 is connected to the host-side device 1 (step S51). After connected to the host-side device 1, the device-side device 2 may receive electric power of 5V (standard power voltage) from the host-side device 1. By the received electric power, the USB interface chip 21 and the low load part 28 are operated. The DC-DC converter 23 converts the received electric power of 5V to electric power of 3.3V, for example, and supplies the converted one to the low load part 28. The standard power voltage is unable to operate the high load part 29, and hence, the switching part 30 is switched so as to block the power supplying to the high load part 29. Incidentally, in a case where the device-side device 2 starts its operation by turning on a switch, if the switch is turned on before the device-side device is connected to the host-side device 1, the operation of the device-side device starts simultaneously with the connection is set up between them. If the switch is turned on after it is connected to the host-side device 1, its connection to the host-side device 1 starts at the instant that the switch is turned on.

The host-side device 1 detects its connection to the device-side device 2 (step S42). The connection to the device-side device 2 may be detected based on a variation of potential of the data line D+ or D−. In the instance of FIG. 1, setting up of its connection to a full speed device is detected through the connection of the data line D+ to the power source via the pull-up resistor 22 in the device-side device 2.

In this state, communication using the normal USB interface is allowed. In steps S43 and S53, negotiation is carried out between the host-side device 1 and the device-side device 2. During the negotiation process, the device-side device 2 requests a large electric power supply of the host-side device 1 since the 29 is to be operated. The negotiation process may determine a voltage of the supplied electric power, for example.

The host-side device 1 judges if it can accept the request from the device-side device 2 (step S44). If acceptable, the host-side device drives the voltage selector 19 to select the power voltage supplied to the device-side device 2 and starts the supplying of the electric power whose voltage is different from the standard power voltage to the device-side device (step S45). For example, it may supply electric power at high voltage, e.g., 24V, to the device-side device.

The device-side device 2 judges if the power voltage on the power supplying line V bus has been changed (step S54). After confirming the power voltage has been changed, it starts the supplying of the electric power of the changed voltage to the related parts (step S55). Specifically, the switching part 30 is switched and supplying of the electric power to the high load part 29 starts. Also in the DC-DC converter 23, the voltage of 24V, for example, is changed to the voltage to be supplied to the related parts. In this way, in the device-side device 2, the related parts operate by the supplied electric power of the changed voltage, for example, 24V. The fact that the power voltage has been changed may be recognized by detecting a voltage level on the power supplying line, communicating with the host-side device 1 or in any other suitable way. A practical way of detecting the voltage level on the power supplying line is that a voltage detection IC is incorporated, and the CPU 24 reads the voltage level through the PIO 27.

In this way, electric power of 5V as prescribed in the USB interface standards or any of other values of voltage can be supplied from the host-side device 1 to the device-side device 2. Particularly where electric power of high voltage is supplied, much electric power can be supplied, while at the same time power loss is lessened. Accordingly, a part which cannot be operated by the electric power of the standard power voltage in the USB interface, for example, the high load part 29, can also be operated. In supplying of high voltage power, it is necessary to allow for the voltage withstanding capability of the cable 3. Subsequently, the host-side device 1 and the device-side device 2 operate while those communicating with each other.

The host-side device 1 monitors if its connection with the device-side device 2 is completed (step S46). When the host-side device is disconnected from the device-side device 2, for example, by pulling out the cable 3, the host-side device 1 detects the disconnection, and the voltage selector 19 changes the voltage of the electric power supplied through the power supplying line to 5V as the standard power voltage of the USB interface. This power voltage change is made since it is impossible to predict a device-side device to next be connected to the host-side device. That is, if the power voltage is returned to the standard power voltage, the system is capable of accepting the connection of every device-side device. The connection completion of the device-side device 2 may be detected by using, for example, a potential variation on the data line D+ or D−. In the FIG. 1 instance, the pull-up resistor 22 is disconnected in the device-side device 2, so that the voltage on the data line D+ varies. This voltage variation is utilized for the connection completion detection.

The device-side device 2 stops its operation when the cable 3 is pulled out and the power supply is stopped. When it is connected again to the host-side device, the operation of the device-side device starts again with the operation based on the standard power voltage of the USB interface.

In some cases, the device-side device 2 requests the power voltage change of the host-side device 1 during the negotiation between the host-side device 1 and the device-side device 2, but the host-side device 1 cannot comply with the request. Example of such cases are: the power voltage changing is impossible by some cause; the device-side device 2 designates a power voltage, but the device-side device cannot supply the electric power of the designated voltage; and another USB device is connected to the system and the power voltage change will affect other devices. In such cases, the host-side device 1 continues the supplying of the electric power of the 5V voltage as the standard power voltage of the USB interface. An alternative is that the host-side device 1 sends to the device-side device 2 a message that it cannot comply with the request by the device-side device.

When the voltage of the electric power fed through the power supplying line is not changed, or when receiving the request rejecting message from host-side device 1, the device-side device 2 cannot operate, and hence it sends to the host-side device 1 a message that an external power source is needed to operate the device-side device (step S56). When the device-side device 2 is provided with some display function, the device-side device itself may display the message. Possible practical displaying methods are to merely light on an LED and to display the message on an LCD screen.

When receiving such a message from the device-side device 2, the host-side device 1 displays the message by using the display function contained in the host-side device (step S48).

The user sees the message displayed in the host-side device 1 or device-side device 2, and recognizes that the device operation is impossible by merely connecting it to the device-side device 2, and takes some measure, for example, uses another power source.

The operation description thus far made is given about an exemplar system operation in a situation that a device to be connected as the device-side device to the system is unknown. In a specific use of the assembling type device, the device-side device to be connected remains unchanged and the same device is left connected to the device-side device 2. In such a case, there is no need of the negotiation process carried out in advance. Accordingly, the host-side device 1 supplies electric power of other voltage than the standard power voltage to the device-side device from a stage immediately after the power source is turned on, while the device-side device may expect the supply of the electric power of a voltage other than the standard power voltage, from the start. In this case, there is no change of the supplied power voltage. Accordingly, the power source 18 for supplying electric power to the power supplying line may be of the type which supplies the electric power of only one voltage, and hence, the necessity of using the voltage selector 19 is eliminated.

In the case of the USB interface, a plurality of device-side devices are connected to a system, through an USB hub, for example. In such a case, if the power voltage is changed in response to a voltage change request by one device-side device, there is a danger that the voltage change will affect other devices. The system which includes the plural device-side devices connected thereto is preferably designed such that only when the device-side device sends a voltage change request to the hose side, the power voltage on the power supplying line is changed. If even one device-side device sends a request of changing the power voltage to another or does not send such a request, the host-side device continues the supplying of electric power of the standard power voltage and does not change the power voltage. If the device-side device not supplied with electric power from the host-side device exists, the host-side device judges that the electric power of the same voltage as that of the electric power supplied to other device-side devices may be supplied to that device-side device. If the USB hub has a high level control mechanism, it gathers information on plural device-side devices and negotiates with the host-side device, and if possible, the electric power of a voltage other than the standard power voltage is supplied.

As seen from the foregoing description, even such a device-side device that needs electric power in excess of the electric power (5V, 500 mA) as specified by the standard power source rules in the USB interface standards, or needs another electric power of a voltage other than the standard power voltage, can be operated by using only the general USB interface. At this time, the device-side device can be operated without the external power source, and therefore, this fact leads to minimal cost. If the power voltage is changed to the standard power voltage, the device-side device can utilize the USB, while sharing with various device-side devices.

What is claimed is:

1. A USB device for performing communications with a second device through a USB interface while supplying electric power to the second device through a power-source supplying line in the USB interface, the USB device comprising:
    a communication unit that communicates with the second device;
    a power source that outputs a voltage selected from a plurality of voltages that include a standard USB interface voltage and a voltage different from a standard USB interface voltage; and
    a selection unit that selects any one of the plurality of voltages for output by the power source;
    wherein the power source supplies one of a selected different voltage and a selected standard USB interface voltage through the power-source supplying line, and
    wherein the selection unit sets the selected voltage to a standard USB interface voltage after it is detected that the connection between the USB device and the second device is disconnected and before it is detected that a connection between the USB device and another device is established.

2. The USB device according to claim 1, wherein
the selection unit selects a standard USB interface voltage prescribed in the standards of the USB interface upon starting the connection to the second device; and
the selection unit selects a voltage different from a standard USB interface voltage based on a negotiation of the USB device with the second device.

3. The USB device according to claim 1, wherein
the USB device is connected to a plurality of the second devices; and
the selection unit selects one of the plurality of voltages according to an instruction based on requests of the second devices when the requests are coincident with one another.

4. A USB device for performing communications with a host device through a standard USB interface, while receiving electric power from the host device through the standard USB interface, the USB device comprising:
a communication unit that communicates with the host device through the standard USB interface;
a low load unit operable by electric power of the standard power voltage prescribed in the standard USB interface; and
a high load unit consuming electric power larger than the electric power consumed in the low load unit;
wherein the communication unit communicates with the host device to select a power voltage that is higher than a standard power voltage prescribed in the standard USB interface,
wherein the high load unit is supplied electric power having a power voltage higher than the standard power voltage from the host device through the standard USB interface, and
wherein the USB device resets to receive a standard power voltage from the host device through the standard USB interface after it is detected that the connection between the USB device and the host device is disconnected and before it is detected that another connection between the USB device and the host device is established.

5. The USB device according to claim 4, wherein the USB device requests the host device to supply large electric power during a negotiation of the USB device with the host device.

6. The USB device according to claim 5, wherein the USB device informs the host device that an external power source is needed when the request of supplying large electric power is rejected.

7. An apparatus for performing internal communications, comprising:
a first device;
a USB interface having a power-source supplying line, the USB interface connected to the first device; and
a second device connected to the first device through the USB interface;
wherein
the first device comprises:
a communication unit that communicates with the second device through the USB interface,
a power source that outputs a voltage selected from a plurality of voltages that include a standard USB interface voltage and a voltage different from a standard USB interface voltage; and
a selection unit that selects any one of the plurality of voltages for output by the power source;
wherein the power source supplies one of a selected voltage different from a standard USB interface voltage and a selected standard USB interface voltage to the second device through the power-source supplying line prescribed in the standards of the USB interface, and
wherein the selection unit sets the selected voltage to a standard USB interface voltage after it is detected that the connection between the first device and the second device is disconnected and before it is detected that a connection between the first device and another device is established.

8. The apparatus according to claim 7, wherein
the second device comprises:
a low load unit operable by electric power of a standard USB interface voltage prescribed in the standards of the USB interface, and
a high load unit consuming electric power larger than the electric power consumed in the low load unit; and
the power source supplies the electric power having a power voltage higher than a standard USB interface voltage to the high load unit.

* * * * *